Figure 2:
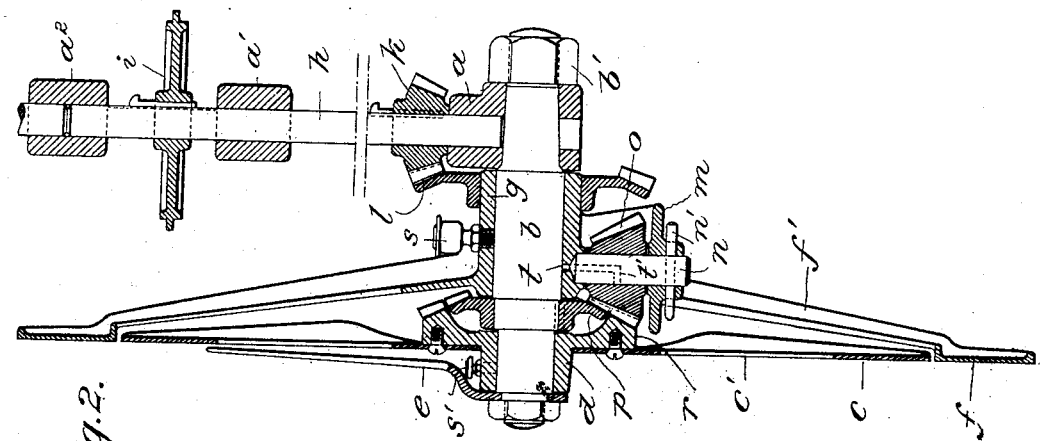

No. 665,821. Patented Jan. 8, 1901.
C. E. ANDERSON.
LEVEL INDICATOR FOR HOISTS.
(Application filed Apr. 4, 1899.)
(No Model.)

Witnesses:

Inventor:
Charles E. Anderson

UNITED STATES PATENT OFFICE.

CHARLES E. ANDERSON, OF ASPEN, COLORADO, ASSIGNOR OF ONE-HALF TO TAYLOR & BRUNTON.

LEVEL-INDICATOR FOR HOISTS.

SPECIFICATION forming part of Letters Patent No. 665,821, dated January 8, 1901.

Application filed April 4, 1899. Serial No. 711,707. (No model.)

*To all whom it may concern:*

Be it known that I, CHARLES E. ANDERSON, a subject of the King of Sweden and Norway, (but having declared my intention of becoming a citizen of the United States,) residing at Aspen, in the county of Pitkin and State of Colorado, have invented a certain new and useful Improvement in Level-Indicators for Hoists, of which the following is a full, clear, and exact description.

The object of this invention is to provide means whereby the engineer or operator of a hoisting plant or apparatus located at or near a mine-shaft may be readily informed of the exact position of a skip, cage, bucket, or other lifting-receptacle in such shaft or an incline, so that he may control the starting, stopping, and slowing down in speed of said lifting-receptacle with relation to the various levels or landings in said shaft or incline.

Prior to my invention various telltale devices have been employed for enabling the engineer of a hoisting apparatus to know where such lifting-receptacle which is being raised or lowered is in the shaft or incline, and practically they embody a strip of wood or metal representing the total depth of the shaft or incline and having marked upon it letters or other indicia to indicate the different levels, stations, or landings therein. This strip has been either straight or bent in the form of a circle, and when straight a pointer travels up and down said strip, while in the circular form a finger traverses the face of the circle, like the hand of a clock, coincidently with the travel of the lifting-receptacle. These devices, while serving to locate approximately the position of the lifting-receptacle in the shaft, cannot locate it with any great degree of accuracy, for the reason that the distance from one level to another, usually one hundred feet, cannot be represented on so necessarily small a device by a greater distance than a few inches. For instance, if the distance on the indicator be six inches, then the movement of the cage in the shaft from one level to another would be represented on the indicator more minutely than the operator is capable of observing at the distance which these indicators must be removed from his eye, and consequently the operator is not able to tell within two or three feet the exact position of the lifting-receptacle, and thus is liable to stop it below the landing-chairs if they are not in position or drop it very heavily on them if they are in position. My invention is designed to obviate this and similar difficulties which have been met with in the practical use of common indicators; and my said invention comprises an annular rotating plate or dial marked to represent the depth of a shaft or incline and the various levels, landings, or stations therein and a pointer and a concentric external annular plate or dial revolving at a higher speed than the first-named dial and also marked to indicate the various levels, stations, or landings in the shaft or incline, the speed of the outer plate or dial when the apparatus is running at full or approximately full speed being so great that the marks thereon are practically invisible. As the approach of the cage to a given level, station, or landing is indicated by the inner dial, the hoisting apparatus is slowed down, and this approach of the cage is indicated by the approach of the mark on the inner dial toward the pointer, and when the corresponding mark on the outer dial comes plainly into view and corresponding marks on the two dials come into alinement with one another and with the pointer the position of the lifting-receptacle is accurately determined.

Having thus stated the principle of my invention, I will proceed now to describe the best mode in which I have contemplated applying that principle and then will particularly point out and distinctly claim the part, improvement, or combination which I claim as my invention.

Figure 1:
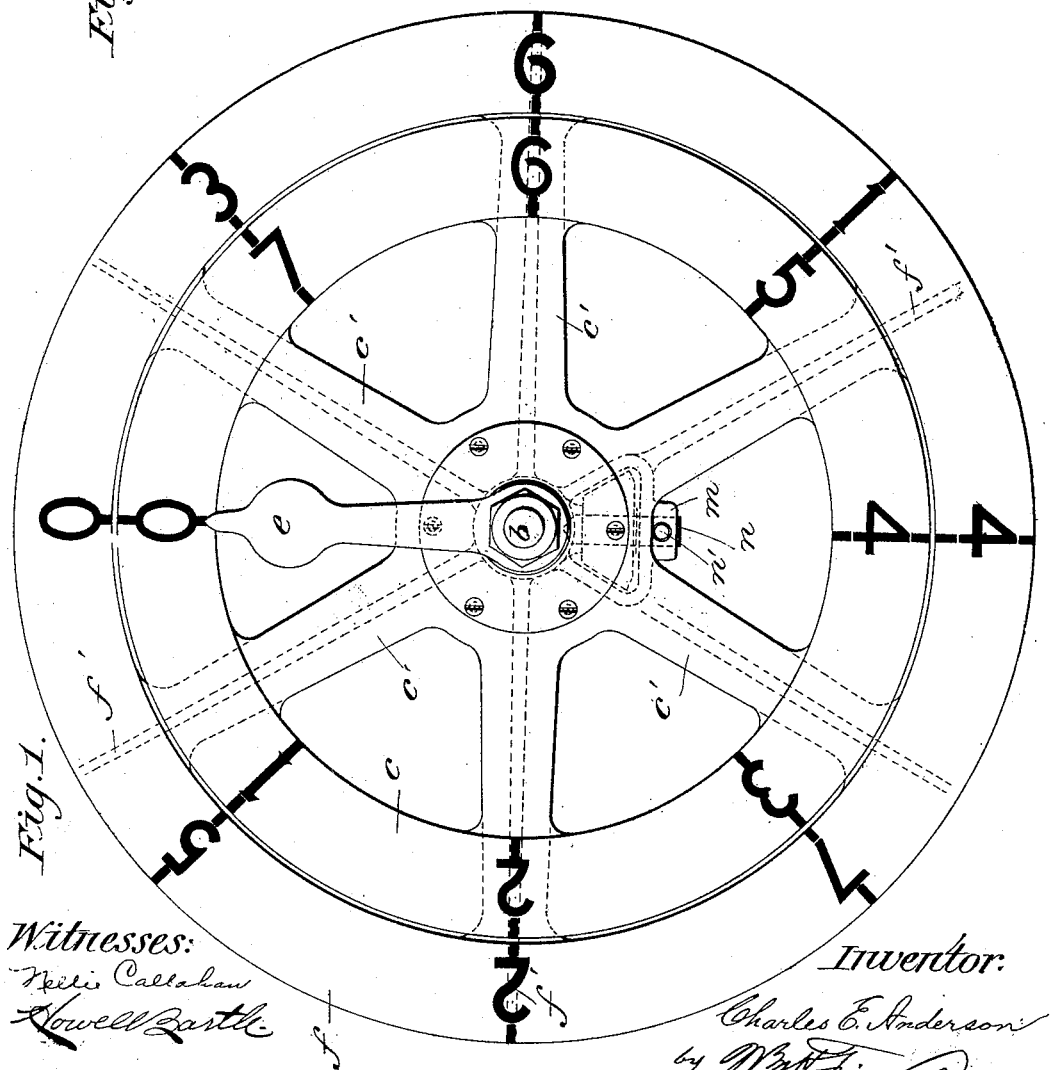

In the accompanying drawings, illustrating my invention, in both figures of which like parts are similarly designated, Figure 1 is a plan view, and Fig. 2 is a vertical section.

The parts $a$, $a'$, and $a^2$ may indicate any suitable bracket, pedestal, or other support for my indicator. The part $a$ has a bearing for a dead-spindle $b$, which may be secured in position by the nut $b'$.

$c$ is an annular plate or dial having arms or spokes $c'$ by which the said dial is secured to a hub $d$, which is mounted to revolve upon the outer end of the spindle $b$.

*e* is a pointer stationarily secured to the outer end of the spindle *b* and beyond the dial *c*.

*f* is an outer concentric annular plate or dial which is provided with arms or spokes *f'*, which are secured to or formed with a hub *g*, mounted to revolve freely upon the spindle *b* back of the hub of the dial *c*. The dials *c* and *f* are provided with numerals or other indicia equal in number to the number of levels, stations, or landings in the shaft or incline.

*h* is a shaft mounted to rotate in the pedestal *a a' a²* and having keyed to it a sprocket-wheel *i*, which may be connected with the hoisting apparatus; but I do not limit my invention to any particular medium for transmitting the motion of the hoisting apparatus to the indicator. The shaft *h* has keyed to it a bevel-pinion *k*, which in turn meshes with a bevel-gear *l*, made fast to the hub *g* and imparting motion of rotation to said hub and its connected apparatus.

*m* is a hanger applied to the hub *g* and containing a stud *n*, which may be fixed thereto, as by a key or wedge *n'*, and on this stud is placed a bevel-pinion *o*, capable of revolving freely upon the said stud. This bevel-pinion *o* meshes with a bevel-gear *p*, which is fixed to the spindle *b* and whereby the said bevel-pinion *o* has given to it rotary motion. The hub *d* of the inner dial has secured to it or formed as a part of it the bevel-gear *r*, which has a greater number of teeth, preferably one or two, than the bevel-gear *p* and meshes with the pinion *o* and is rotated by said pinion *o* to revolve the dial *c*. Thus it will appear that the inner dial *c* has a rotary motion of less speed than that of the outer dial *f* and any suitable gearing which will accomplish this is within the spirit and scope of my invention.

Oil-cups *s* and *s'* are applied to the hub *g* and the hub *d*, and in order to lubricate the stud *n* a hole *t* may be made in the hub *g* leading to an L-shaped channel *t'* in the stud.

As already stated, it is designed that the outer dial be geared to run faster than the inner dial, and by this construction the operator's knowledge of the exact position of the lifting-receptacle in the shaft or incline is increased in the proportion that the outer dial revolves faster than the inner. In practice the outer dial is run at about one-fourth of the speed of the cage, so that it is easy for the operator to tell within the fraction of an inch where the lifting-receptacle is whenever he slows down to make a landing. At all other times the rapid speed of the outer dial practically throws the figures thereon out of view.

The object of my invention would be attained by having one of the dials stationary and revolving the pointer; but I prefer to employ the stationary pointer and the two revolving dials.

As already stated, the gearing is proportioned to cause the outer dial to run more rapidly or at a greater speed than the inner dial. One instance will suffice to illustrate a practical proportion—that is to say, if the fixed wheel *p* contain forty teeth and the revolving wheel *r* contain forty-two teeth and both of them engage with the same pinion *o* then the outer or fast-running dial would revolve twenty times as fast as the inner or slow-running dial, the theory being that the slow-running gear will run as much slower than the fast-running gear in the proportion that the difference between the number of teeth in these gears bears to the total number of teeth in the fixed gear.

The indicator marks or figures are not necessarily equal distances apart on either the inner or outer dial, these distances being regulated by the distances between the different working levels, stations, or landings of the particular mine-shaft, for example, in which the apparatus is to be used, and the ratio between the inner and outer dials has to be practically determined by the speed of the hoisting apparatus with which the indicator is connected. Hence the marks or figures are to be placed upon the dials in accordance with the conditions existing in the plant to which the indicator is to be applied. For example, suppose the indicator is to be applied to a shaft having three levels. If the distance between the first and second levels be seventy-five feet and the distance between the second and third levels be one hundred and fifty feet, then the distance between the figures "1" and "2" on the dials will be only half the distance between the figures "2" and "3." If the hoisting apparatus is running very slow, the ratio can be, say, one hundred to one, or one hundred teeth in one gear-wheel and one hundred and one in the other, so that the outer disk or dial will revolve one hundred times to the inner dial's once. In ordinary practice the outside dial will make twenty-one revolutions to one of the inner dial, forty-four teeth being on the one wheel and forty-two teeth on the other, which is a ratio of twenty-one to one. Account has to be taken also of the elongation of the hoisting-cable in determining the positions of the marks or figures, so that the marking of the dials is a matter of practical experiment in any given instance of the use of the indicator and the relative speeds between the two dials is an arbitrary question.

Although I have specifically shown and described my invention as applied to one specific use, I mean not so to limit it, for obviously it is capable of use to indicate the position of other moving bodies than the cages or other lifting receptacles used in mine-shafts, and may be employed generally as an indicator, especially where the indicator and the part or body whose location, condition, or position is thereby exhibited are distant from one another.

What I claim is—

1. An indicator, comprising essentially a pointer and two annular dials, one of these three being stationary, and differential gearing interposed between the other two to effect their revolution at different speeds, substantially as described.

2. An indicator, comprising essentially a stationary pointer, two revoluble concentric dials, and differential gearing interposed between said dials for the purpose of revolving them at different speeds, substantially as described.

3. An indicator, comprising essentially a stationary pointer, two revoluble concentric dials, and differential gearing interposed between the said dials and adapted to revolve the outer dial many times as fast as the inner, substantially as described.

4. A level, station or landing indicator for the hoisting apparatus of mines and the like, comprising essentially a pointer, two concentric dials marked to represent the various levels, stations or landings in a shaft, means for transmitting motion to the indicator from the hoisting apparatus, and gearing to which the motion is transmitted and which gives different rates of speed to the said dials, substantially as described.

5. A level, station, or landing indicator, for the hoisting apparatus of mines and the like, comprising essentially a pointer, a revoluble disk marked to indicate the levels, stations, or landings in the shaft, and having a surface travel approximately showing the position or travel of the lifting-vehicle in the shaft, a second disk similarly marked and having a greater surface travel than the first-mentioned disk, a dead-spindle upon which the said disks are mounted to turn, and differential gearing interposed between the said disks for turning them, substantially as described.

6. An indicator, comprising essentially a stationary pointer mounted upon a dead-spindle, an annular revoluble dial also carried by said spindle, a second annular revoluble dial on said spindle, a driving-shaft and gearing interposed between the said driving-shaft and the said dials to impart differential movement thereto in fixed proportion, substantially as described.

7. In an indicator, the combination of a dead-spindle, a support therefor, a driving-shaft, a revoluble annular dial mounted upon said spindle and geared to said shaft, a loose pinion carried by the said dial, a fixed gear-wheel on said spindle meshing with said pinion to rotate it, an inner concentric dial mounted to revolve upon said spindle and having a gear-wheel in mesh with and driven from the pinion carried by the outer dial, and a fixed pointer, substantially as described.

In testimony whereof I have hereunto set my hand this 30th day of March, A. D. 1899.

CHARLES E. ANDERSON.

Witnesses:
GEO. R. COLE,
EDWARD F. BROWNE.